（12) United States Patent
Rella

(10) Patent No.: US 12,220,848 B2
(45) Date of Patent: Feb. 11, 2025

(54) METHOD FOR THE QUALITY CONTROL AND/OR TRACKING OF AN INJECTION MOLDED PART PRODUCED IN A PRODUCTION CYCLE, AND PLASTIC INDUSTRIAL FACILITY FOR THIS PURPOSE

(71) Applicant: WITTMANN TECHNOLOGY GMBH, Vienna (AT)

(72) Inventor: Johannes Rella, Payerbach (AT)

(73) Assignee: WITTMANN TECHNOLOGY GMBH, Vienna (AT)

( * ) Notice: Subject to any disclaimer, the term of this patent is extended or adjusted under 35 U.S.C. 154(b) by 541 days.

(21) Appl. No.: 17/269,709

(22) PCT Filed: Aug. 9, 2019

(86) PCT No.: PCT/AT2019/060255
§ 371 (c)(1),
(2) Date: Feb. 19, 2021

(87) PCT Pub. No.: WO2020/037342
PCT Pub. Date: Feb. 27, 2020

(65) Prior Publication Data
US 2021/0197432 A1 Jul. 1, 2021

(30) Foreign Application Priority Data
Aug. 21, 2018 (AT) ................ A50707/2018

(51) Int. Cl.
*B29C 45/18* (2006.01)
*B29C 45/72* (2006.01)
(Continued)

(52) U.S. Cl.
CPC ...... *B29C 45/1808* (2013.01); *B29C 45/7207* (2013.01); *B29C 45/76* (2013.01);
(Continued)

(58) Field of Classification Search
CPC .... G05B 19/41875; Y02P 90/02; B29C 45/76
See application file for complete search history.

(56) References Cited

U.S. PATENT DOCUMENTS

| 5,461,570 A | 10/1995 | Wang et al. |
| 5,696,686 A | 12/1997 | Sanka et al. |

(Continued)

FOREIGN PATENT DOCUMENTS

| AT | 7304 | 1/2005 |
| EP | 0 750 914 | 1/1997 |

(Continued)

OTHER PUBLICATIONS

Int'l Search Report (Form PCT/ISA/210) conducted in Int'l Appln. No. PCT/AT2019/060255 (Oct. 28, 2019).

(Continued)

*Primary Examiner* — John J DeRusso
(74) *Attorney, Agent, or Firm* — GREENBLUM & BERNSTEIN, P.L.C.

(57) ABSTRACT

Method for the quality control and/or tracking of an injection molded part produced in a production cycle using at least one processing machine of the plastic processing industry and a plastic processing facility, in which production devices or stations arranged upstream or downstream are connected together via a network. Each individual injection molded part or a specified number of injection molded parts is assigned a quality value composed of multiple quality values in that each device or station in the production chain ascertains or generates its own quality value and extends same by the transmitted values of each previous device or previous station and forwards same as the new quality value to the following device or following station or in that a separate collecting station, in particular a hardware and software, requests the quality values, the device values and/or material values thereof, from the individual devices (Continued)

Figure 1:
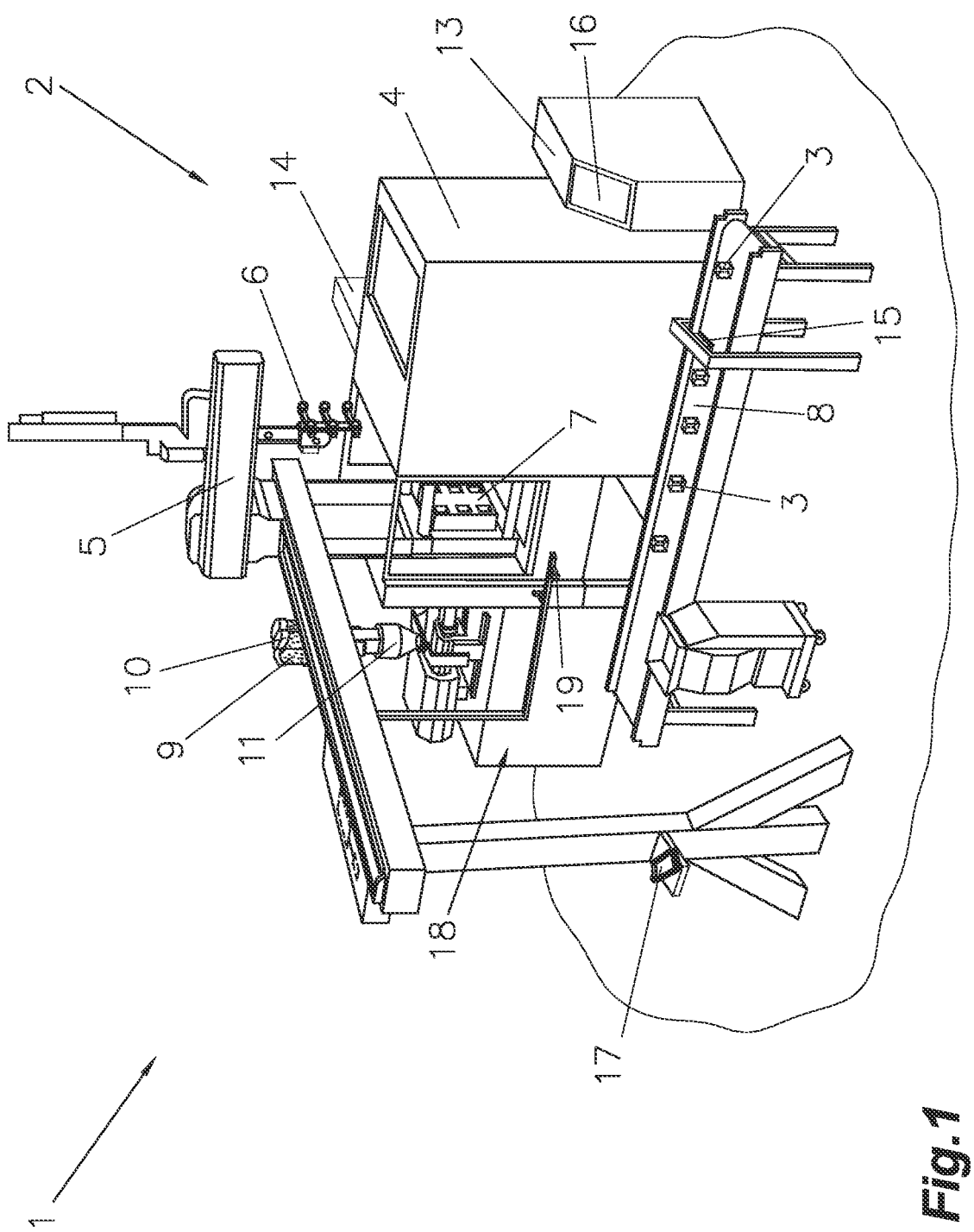

or stations or is transmitted thereto, and the collecting station puts said the values into correlation.

15 Claims, 4 Drawing Sheets

(51) Int. Cl.
*B29C 45/76* (2006.01)
*B29C 45/78* (2006.01)
*B29C 45/84* (2006.01)
*G05B 19/418* (2006.01)

(52) U.S. Cl.
CPC ............. *B29C 45/78* (2013.01); *B29C 45/84* (2013.01); *G05B 19/41875* (2013.01); *B29C 2945/7607* (2013.01); *B29C 2945/76076* (2013.01); *B29C 2945/76183* (2013.01); *B29C 2945/76287* (2013.01); *B29C 2945/7629* (2013.01); *B29C 2945/76317* (2013.01); *B29C 2945/76321* (2013.01); *B29C 2945/76331* (2013.01); *B29C 2945/76464* (2013.01); *B29C 2945/76846* (2013.01); *Y02P 90/02* (2015.11)

(56) References Cited

U.S. PATENT DOCUMENTS

| | | | |
|---|---|---|---|
| 6,522,939 B1 | 2/2003 | Strauch et al. | |
| 2003/0155415 A1* | 8/2003 | Markham | G06Q 50/00 235/376 |
| 2005/0053684 A1 | 3/2005 | Pitscheneder et al. | |
| 2007/0021856 A1* | 1/2007 | Popp | G06Q 50/04 700/110 |
| 2009/0171476 A1 | 7/2009 | Alon | |
| 2017/0153616 A1 | 6/2017 | Sakakibara et al. | |
| 2019/0129402 A1* | 5/2019 | Kawano | G05B 23/02 |
| 2019/0240889 A1* | 8/2019 | Lettowsky | B29C 48/10 |
| 2019/0317476 A1* | 10/2019 | Miyagi | G05B 19/41875 |
| 2021/0232126 A1* | 7/2021 | Feyo Gebhard | G05B 19/41875 |
| 2021/0263507 A1* | 8/2021 | Kawano | G05B 19/41875 |

FOREIGN PATENT DOCUMENTS

| | | | |
|---|---|---|---|
| JP | H08 22494 | 1/1996 | |
| JP | 2017-033525 | 2/2017 | |
| WO | WO-03032096 A2 * | 4/2003 | ............. B28B 15/00 |
| WO | 2007/141785 | 12/2007 | |

OTHER PUBLICATIONS

Int'l Written Opinion (Form PCT/ISA/210) conducted in Int'l Appln. No. PCT/AT2019/060255 (Oct. 28, 2019).
Int'l Prelim. Exam. Report (Form PCT/IPEA/409) conducted in Int'l Appln. No. PCT/AT2019/060255 (Jun. 8, 2020).

\* cited by examiner

METHOD FOR THE QUALITY CONTROL AND/OR TRACKING OF AN INJECTION MOLDED PART PRODUCED IN A PRODUCTION CYCLE, AND PLASTIC INDUSTRIAL FACILITY FOR THIS PURPOSE

The invention relates to a method for quality control and/or follow-up of an injection-molded part manufactured in a production cycle, and a plastics industry system therefor as described in the preambles of the independent claims.

Plastics industry systems or plants, respectively, are already known in which data are recorded over the entire period by the processing machine and, in some cases, likewise by devices integrated into or connected to the processing machine by means of appropriate activation. Subsequently, these data can be transferred to a laptop or computer by connecting the working system to it and stored on the same, after which the data are externally available on the laptop or computer for analysis.

However, systems have also been described in which at least the processing machine and, in some cases, devices integrated into or connected to the processing machine are linked via a network to a database server, where the data are recorded.

The disadvantage here is that it is not easy to clearly assign the collected quality data to a specific injection-molded part that has been produced. For this purpose, the data from each device would have to be evaluated at great expense and ranked and assigned according to the process sequence, where the time of manufacture can often be days, weeks, months or years in the past. In many cases, assignment to an injection-molded part is possible only to a limited extent, since the temporal sequence with the delays in the process chain can be determined only to a very limited extent or not at all from the data.

The objective of the present invention is therefore to create a method for quality control and/or follow-up of an injection-molded part manufactured in a production cycle, as well as a plastics industry system of the type mentioned above, whereby on the one hand the disadvantages described above are avoided and on the other hand unambiguous assignment of the data to a product, in particular an injection-molded part, is made possible.

The objective is achieved by the invention.

The method according to the present invention is characterized in that each individual injection-molded part or a specific number (batch) of injection-molded parts is assigned a quality contribution, consisting of several quality contributions, where each unit or station in the production chain determines or generates, respectively, its own quality contribution and extends it with the transmitted quality contribution(s) of the respective upstream unit(s) or predecessor upstream(s) and forwards it as a new quality contribution to the downstream unit or downstream station, or a separate collecting station, in particular a hardware and software (CoQ—"Chain of Quality"), queries the quality contributions, in particular their device contributions and/or material contributions, from the individual devices or stations or sends the same to them, and the collecting station correlates these. It is advantageous here that a separate quality contribution is generated for each product produced, in particular injection-molded parts, wherein the contributions are stored on a storage medium, for example in the form of a file or a database. Here it is possible that a specific device from the production line, which preferably has a sufficient storage medium, is selected, i.e. that during the installation of the system it is determined which device is responsible for the storage of the quality contributions. However, it is also possible that an independent device or collecting station, respectively in particular hardware and/or software, is used for this purpose, which is connected to the individual devices of the plastics industry system and queries their device contributions or material contributions, respectively, and creates the quality contributions from them.

It is thus possible for the first time that the quality can be determined and assembled from the manufacturing times of many devices involved, and that one can evaluate and display the sequence, which devices were involved in sequence and at what times. At what time which devices with which device or material contributions were involved in the production chain for a specific part can be reconstructed only in retrospect and therefore not or only with great difficulty and/or very inaccurately according to the prior art, where all data of all devices are constantly and independently being recorded.

As an alternative to creating a quality contribution for each created product or injection-molded part, respectively, it is also possible that a setting can be made that is valid for several products, in particular provided with an identification number. In this context, material batch means that a specific provided quantity of material, in particular plastic granules, is processed so that all products manufactured with this material batch fall within the quality contribution for this material batch. Preferably, the quantity, period and/or manufacturing number of the manufactured products or injection-molded parts, respectively, are also stored in the quality contribution in order to find an assignment of an injection-molded part or a manufacturing number to the quality contribution. It is also possible that several quality contributions are combined into a new quality contribution. This happens quasi continuously in the individual devices, wherein this can also happen at the end of the chain of devices, for example "a box".

Here the quality contribution is compiled by concatenation of the individual device contributions and/or material contributions of the devices in the production cycle from the extraction of the granules from a reservoir, the conveying, drying and possible metering of the material with other materials down to the creation of the injection-molded part and the subsequent extraction of the created injection-molded part from the processing machine by a robot and a possible subsequent quality control via a camera system, so that a complete follow-up of all relevant parameters that were decisive for producing the product is possible.

Preferably, the quality contribution includes all data essential for product quality and traceability, in particular the device contribution and the material contribution, whereby it is possible that the material contribution, used for the provision and conveying of the material, in particular granules, is stored independently, since manual settings or adjustments, respectively, are often made here. The device contribution includes all important parameters, in particular actual values and/or good/bad classification, where an adjustment of the actual value is within a target tolerance range.

It can therefore be said that it is advantageous for contributions to quality to be generated or created, respectively, in parallel in fully automated fashion during the production workflow for producing the injection-molded part. Thus, practically with the end of production of the injection-molded part, the quality contribution for this injection-molded part is also completed and can thus be archived. It is advantageous if these are integrated into a database so that they can be evaluated more easily at a later date.

Advantageous embodiments are those in which a quality contribution in a device or station is composed of the quality contributions of the predecessor devices or predecessor stations and its own device contribution and/or material contribution. This ensures that the quality contribution is automatically completed with the most important data of the devices or stations, respectively, so that at least one quality contribution is available at the end.

Advantageous embodiments are also those in which the device contribution of a device is formed by specifically defined data of this device and preferably with a time stamp. In this way, the data essential for the injection-molded part being produced can be selected in a simple manner for different injection-molded parts and changed over at any time. It is also possible that different data are selected for the same devices in the work process, which are stored in the quality contributions.

In an advantageous embodiment, the material contribution is formed by specifically defined data on the material, in particular the estimated or measured amount of material conveyed and/or processed by the respective device or station. The advantage of this is that any kind of delay in the feeding and processing of the material, in particular process-related dwell times, drying times of the material, newly composed material batches as a result of mixing processes, unavoidable material feeds during conveying to the processing machines, etc., are correctly included in the quality contributions in terms of time, thus enabling clear assignment and quality determination.

Advantageous embodiments are such in which the quality contribution of preferably all the devices or stations for producing the injection-molded part is placed in a temporal context. As a result, a constant increase of data in the quality contribution is achieved independently by the devices, without need for manual intervention.

Advantageous embodiments are such in which the delay times for preparing or processing the material or the material contributions in the individual devices are taken into account when creating the temporal relationship in the quality contribution, whereby the delay times are preferably determined by the devices themselves, alternatively by a test run or manually set and stored. This ensures that the data are used at the appropriate time, producing a much more accurate quality contribution.

Advantageous embodiments are such where for the material supply the material conveyed from a reservoir or hopper, respectively, or a metering device is split into material contributions, preferably in the size of the conveying volume of the conveying device used, and that the quality contributions refer to such material contributions. In particular in material supply, it is not possible for the conveyed amount of material, in particular granules, to be always measured exactly. Here, for example, it is advantageous if a larger quantity of material is distributed over a defined period of time. It is easy to record a larger quantity so that the material actually consumed is distributed over injection-molded parts produced during this period.

Further advantageous embodiments are such in which in which the quality contributions are stored in tables in one or several distributed databases/lists on a device-type basis and are related via IDs (identification codes). The main purpose of this is that the quality contributions do not have to be passed from device to device, but only an ID is passed on to these contributions. The quality contributions added by the device are stored under a new ID, wherein the new ID also references the previous ID. This allows the storage volume of the embedded devices to be kept low.

Advantageous embodiments are such in which the material contributions are split into further material contributions depending on the processing procedure, or several material contributions are combined under a new quality contribution ID. This means that storage volume can in turn be kept to a minimum or data forwarding can be carried out very quickly and without delay due to the low data volume, respectively. However, advantageous embodiments are also such in which the quality contributions are further supplemented by each device involved in the processing of the material contributions. In this way, the quality contribution of each device in this production cycle is increased or supplemented, respectively, with data "step by step". Here it is possible that the individual devices or stations, respectively, are responsible for only one production cycle or also for several production cycles running in parallel.

In the case of embodiments in which an estimated delivery quantity of material conveyed into a conveying device can be subsequently corrected as it passes through metering units (for example, in a blender or also in the case of an injection-molding machine) by adjusting one or several distributed databases/lists with stored delivery quantities or by a control algorithm, it is advantageous that a correction can thereby be made at any time in the event of deviations in the process, so that the material quantity actually processed corresponds to the stored delivery quantity, for example, at the end of a shift or another defined time unit.

Advantageous embodiments are also those in which the estimated stored delivery quantities or delivery parameters, respectively, are calculated in such a way that they result in the delivery quantities measured at those devices with unambiguously measurable delivery quantities, such as, for example, the injection-molding machine and blender, etc. This allows an automatic adjustment to be made by determining this at those devices with exact quantity measurements and subsequently calculating it back to other devices. If necessary, quantities can also be corrected manually, in particular if unforeseen loss quantities occur (e.g. the injection unit of the injection-molding machine is ejected, container is cleaned).

Advantageous embodiments are such in which the data of the device contribution from the robot preferably consist of the box ID and/or of the position in which the injection-molded parts are deposited or stacked, respectively, and/or of the time at which the injection-molded part is removed from the conveyor belt. This allows all data to be documented, including those that take place after the injection-molded part has been produced, especially that for the traceability of the part or packaging unit, such as, for example, labeling, packaging, removal from the conveyor belt.

Advantageous embodiments are also those that use a conveyor belt, for example when used as a cooling line, with its delay times processed as a station/device, so that the cumulative quality contribution is also available for that part which is currently at the end of the conveyor belt. Thus, the assignment of quality contributions to a specific plastic part is maintained even via devices with special delaying processes.

Advantageous embodiments are such in which the exact time of processing of the material contribution of each process involved is recorded and stored by each device or station, respectively, are advantageous. This ensures that an exact temporal course can be traced back at a later point in time.

Furthermore, the objective of the present invention is also achieved by a plastics industry system in which during a production cycle or production run, respectively, that is from the extraction of the granules from a reservoir down to the creation of the injection-molded part and the subsequent extraction and deposition of the produced injection-molded part from the processing machine by the robot and a possible subsequent quality control via a camera system, each device is designed for producing a common quality contribution, where each device or station, respectively, is designed for adding and storing its device contribution and/or material contribution, preferably with a time stamp, in the existing and forwarded quality contribution, or in that a separate collecting station, in particular a hardware or software (CoQ—Chain of Quality), is designed for querying and correlating the device contribution and/or material contribution of the quality from the individual devices.

It is advantageous here that a contribution for the quality, in particular a quality contribution consisting of material contributions and/or device contributions, is thereby created concomitantly with the production cycle, in which the defined data, parameters, actual and/or target values, as well as good and bad part qualification are recorded and stored from each device or station, respectively, at its time of manufacture, which are subsequently combined to form a specific contribution, in particular the quality contribution, preferably in chronological order.

The invention is now explained in more detail by means of an exemplary embodiment shown in the drawings, wherein the invention is not limited to the illustration shown, in particular not to the structure and design of the system.

Figure 2:
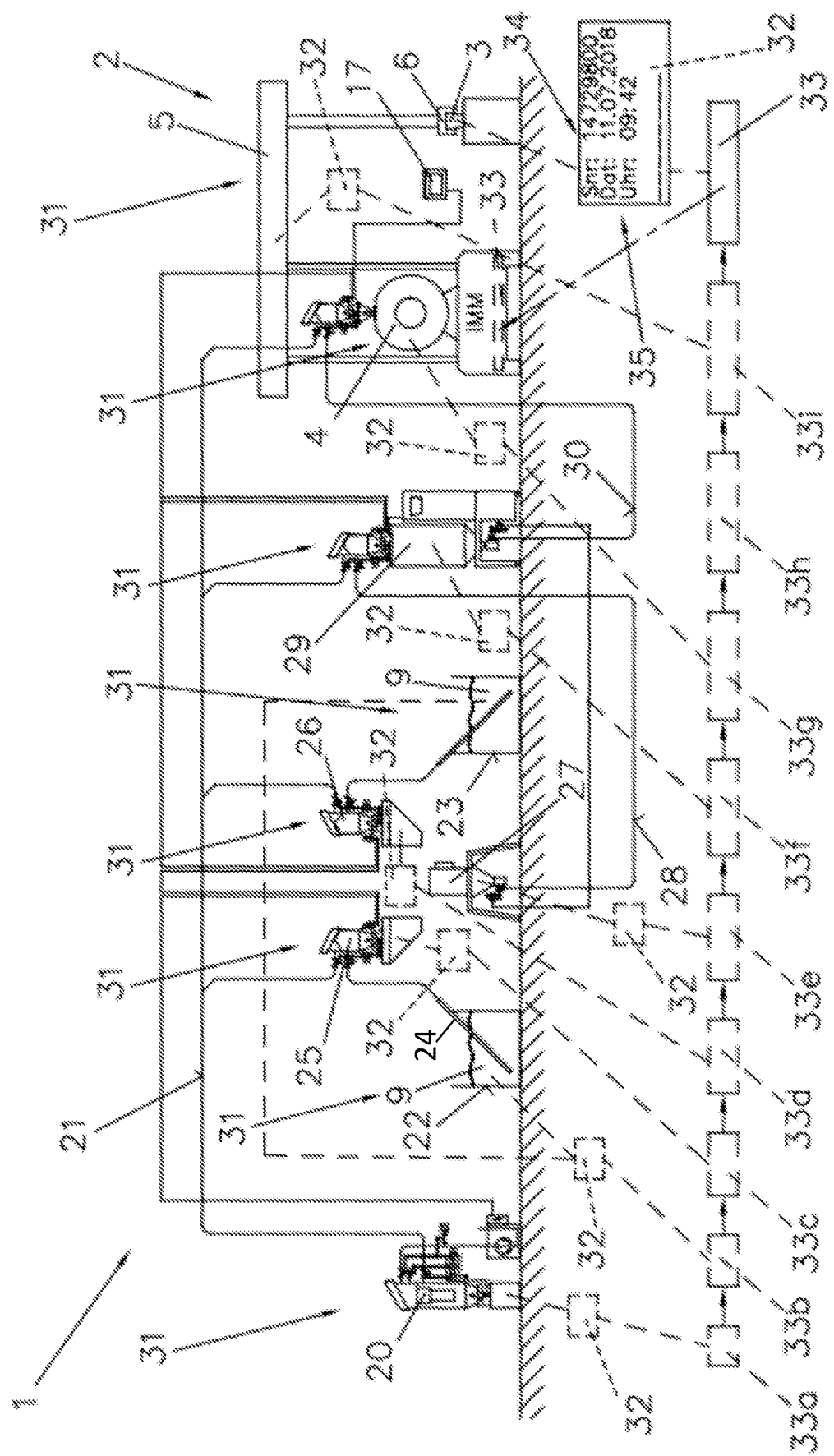
Figure 3:
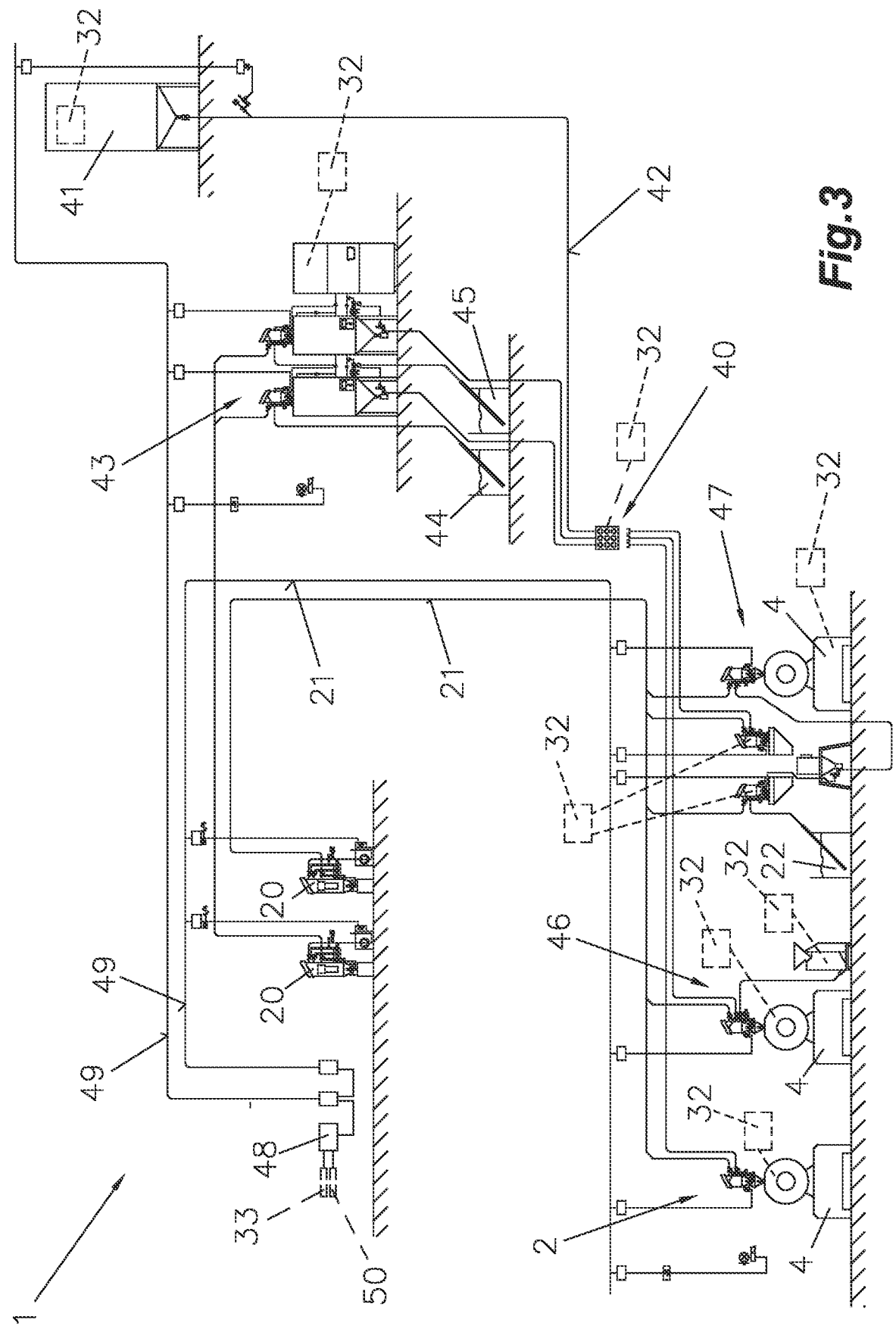
Figure 4:
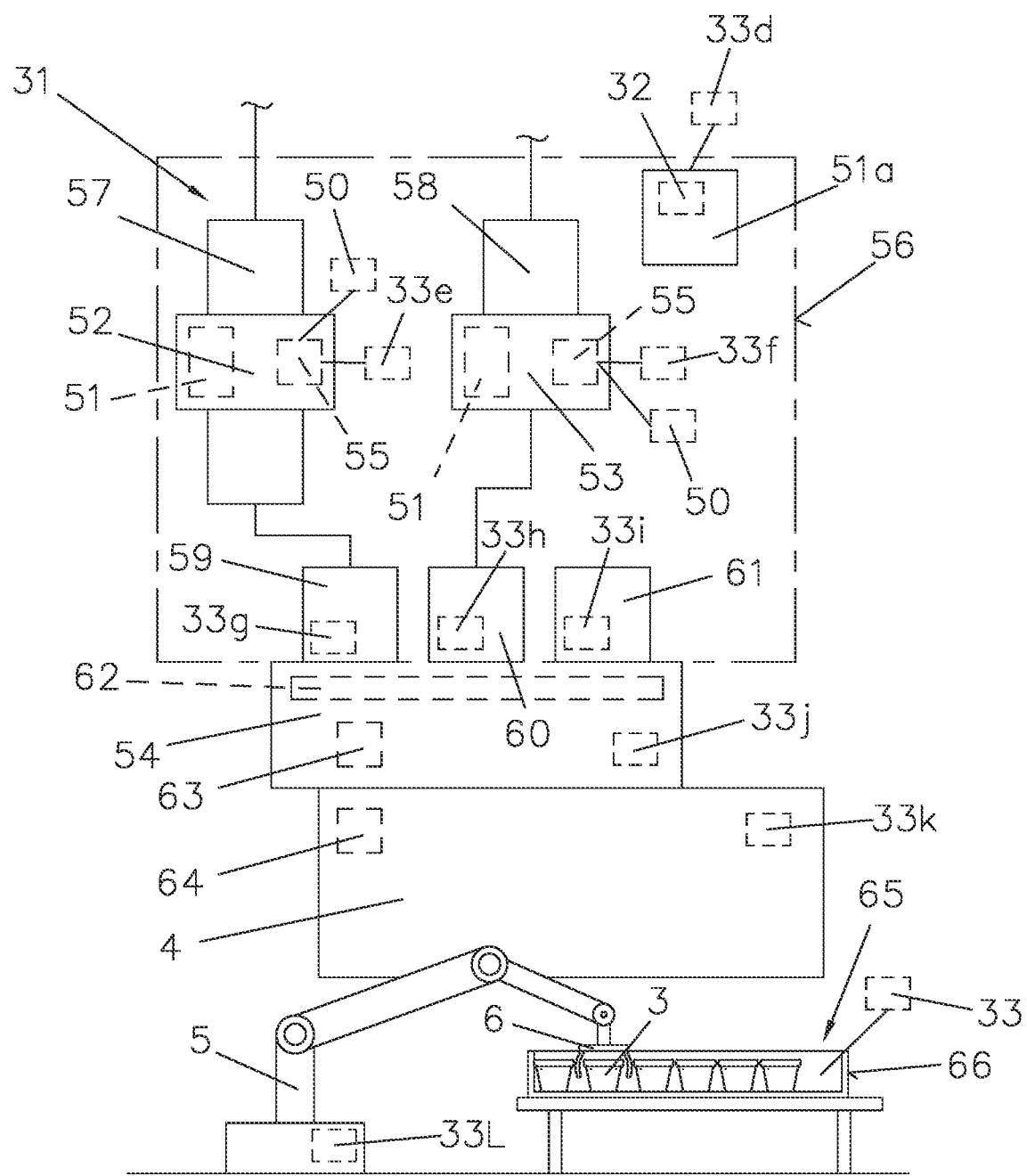

The figures show:

FIG. 1—an overview illustration of a plastics-processing industrial installation in a work cell, simplified, for illustrative purposes only;

FIG. 2—a schematic representation of a plastics-processing industrial installation with all the devices required therein, simplified, for illustrative purposes only;

FIG. 3—a schematic representation of a further example of the design of a plastics industry system, simplified, for illustrative purposes only;

FIG. 4—a further exemplary embodiment of a plastics industry system, simplified, for illustrative purposes only.

It should be stated by way of introduction that, in the individual embodiments, identical parts are provided with the same reference numbers or same component designations, respectively, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

FIG. 1 shows a detail of the design inside the plastics industry system 1, of a work cell 2 for injection molding applications, in which the individual components/devices for producing one or several products/semi-finished products or injection-molded parts 3 are interconnected in work cell 2. Preferably, as the processing machine an injection-molding machine 4 is used, to which a robot 5 or handling robot, respectively, next to it or above it for extraction of the produced injection-molded part 3 is assigned. Here, the injection-molded part 3 is removed from an opening injection mold 7 by an extraction device 6, in particular equipped with a gripper with gripping tongs and/or suction nozzles, and deposited on a device, in particular a conveyor belt 8.

For example, it is possible that for the production of an injection-molded part 3 plastic granules 9 are fed to the processing machine 4 via a granule conveyor 10 and possibly via a metering device (dosing device, e.g., a gravimetric dosing device) 11 or from a reservoir. By means of a temperature control unit 13 and/or cooling unit, the injection mold 7 can be kept at operating temperature by feeding a temperature control medium or heated or cooled accordingly, respectively, so that optimum processing of the plastic granules 9, which must be plasticized for injection into the injection mold 7, is made possible.

In addition, the system can be equipped with a monitoring device 15, in particular a camera system, in order to be able to carry out an automatic quality control of the manufactured product 3. Very often there are also upstream or downstream automation systems 18, e.g. sprue cutter-19, centering, separating, feeding, crate and pallet stacking stations, etc., which are directly integrated into the robot controller or industrial installation 1, respectively, and controlled by it via digital or analog signals or other communication interfaces. The creation of the flow and control logic for the robot 5 or handling robot 5, respectively, and any connected automation components 18 or systems is typically carried out in a teach-in procedure. Likewise, the programming of the flow and control logic can first be done offline on a PC. The system-specific values, e.g. the actual positions of the axes, are then added in turn in the teach-in procedure.

In order for the individual devices to be adjusted or programmed, respectively, they are preferably equipped with corresponding control electronics (not shown), wherein the setting or programming, respectively, is entered and displayed via displays 16 or a robot controller 17 arranged on the devices. Of course, it is also possible to program or adjust, respectively, the devices via an external component connected to the units via an interface.

For the sake of completeness, it is also mentioned that all devices are connected to corresponding lines, in particular power supply, network and connection lines, liquid supply lines, material lines, etc., which in the interest of clarity were not displayed in the representation shown.

FIG. 2 shows a circuit diagram of a setup of the plastics industry system 1 with all essential supply lines and a plastics-processing system, in particular the injection-molding machine 4.

In the example shown, the material is supplied via a vacuum device 20, in particular a vacuum pump, which builds up a negative pressure in vacuum line 21 so that the starting material, in particular granules 9, can be removed from two reservoirs (storage tanks) 22, 23. For this purpose, a vacuum is applied by the vacuum device 20 in the material line 21, which is connected, for example, to a suction lance 24 in each case, via which the granules 9 are sucked out of the reservoir 22, 23 and fed to a metering device 27.

The conveying devices 25, 26 are first used to convey the granules 9 from the two reservoirs 22, 23 into the supply containers of the metering device 27, in order to subsequently mix them together in the correct mixing ratio, from which the mixed granules 9 are then fed via a material supply line 28 to a drying station, in particular a mobile dryer 29, where dry air flows through the granules 9 and all moisture is removed, so that the granules 9 are prepared for the injection molding process. Subsequently, via a further material supply line 30 and a further conveying device, the dried granules 9 are fed to the plastics processing machine, in particular the injection-molding machine 4, and processed by the latter. Here, as shown in FIG. 1, the injection-molding machine is organized, for example, in the work cell 2, in which a wide variety of devices, such as a flow controller 14, a temperature control unit 13, a robot 5, a conveying device or belt 8, a teach box or robot controller 17, respectively, etc., are interconnected for producing the injection-molded part 3 in the best possible quality, albeit their detailed function of the individual devices will not be discussed here in more detail, since they are already known from the prior art.

As can be seen from the diagram, in order to produce a finished injection-molded part 3, a large number of devices or stations, respectively, 31 are passed through, starting with material conveyance and ending with depositing or packaging, respectively, of the finished product, whereby in each station 31 for determining the quality of the product its actual values, set values, etc. are essential in order to be able to draw conclusions about the quality of the product. The relevant prior art does not enable a quality assignment of an injection-molded part 3 to be recorded, evaluated and stored in a simple manner throughout the entire production chain.

According to the present invention, it is provided that during a production cycle or production workflow, respectively, i.e. from the extraction of the granules 9 from the reservoir 22, 23 down to the creation of the injection-molded part 3 and the subsequent extraction and deposition of the produced injection-molded part 3 from the processing machine by the robot 5 and a possible subsequent quality control via a camera system, each device 31 or station 31 involved combines a device contribution 32 coordinated for this device 31 or station 31 into a common quality contribution 33 (33a-33i).

As shown schematically with dashed lines, the generated quality contribution 33 is preferably stored in the largest unit of equipment, in particular the injection-molding machine 4, the robot 5 or a dedicated CoQ unit, when an injection-molded part 3 is finished and no further machine work steps are to be carried out, i.e., that from each device 31 or station 31, respectively, from the start of production to the finished end product, i.e. the injection-molded part 3, its defined device contribution 32 is recorded and documented at the time of production, whereupon this device contribution 32 is integrated by the device 31 or station itself, respectively, into the quality contribution 33a to 33i (33) and thus the quality contribution 33a to 33i is continuously extended to the last addition 33. At the end, the quality contribution 33 is completed and stored with the fabrication number or serial number, respectively, 34 of the injection-molded part 3 together with the associated date and time 35 and other defined data. Here, a plurality of different quality contributions 33 can be stored on the device 31 or station 31, respectively.

In the schematically shown workflow for forming the quality contribution 33 from a number of combined individual device contributions 32, it is also possible (as shown for the granules 9 in the two reservoirs 22, 23) that, when the material or granules 9 are delivered and filled into the reservoirs 22, 23, a sample is removed or a batch number analyzed and its device contribution 32 determined and entered, so that also for the material or granules, respectively, 9 a corresponding device contribution 32 is available, which can be created and entered manually or semi-manually but if possible also automatically. Since two separate reservoirs 22, 23 are used in the exemplary embodiment shown, these two have been combined into a single device contribution 32, wherein the data for the two granule materials 9 are contained in the two reservoirs 22, 23. Of course, it is possible for a separate independent device contribution 32 to be created for each reservoir 22, 23. It is also possible for several individual devices 32 to be combined into a device group and for the latter to transmit corresponding defined data, so that a device contribution 32 can be created for this device group by a device 31 or station, respectively. This device 31 or station 31, respectively, is then preferably also responsible for processing and supplementing the quality contribution 33a-33i (33) before the next device 31 or station 31 takes over the quality contribution 33.

As a matter of principle, it is possible that the quality contribution 33 is always processed sequentially, i.e. that the first device 31, in the exemplary embodiment the vacuum pump 20, starts with the creation of the device contribution 32 and converts it into a quality contribution 33a and stores it, whereupon the next device 31, namely the reservoirs 22, 23, uses the device contribution 32 for the granules samples and adds it to the quality contribution 33b and stores it. Next, the two conveying devices 25, 26 on the metering unit create their device contribution 32 and add this in turn to the quality contribution 33a and 33b already consisting of vacuum pump 20 and material sample and add this to their device contributions 32 to form quality contribution 33c and store it. This serial creation of the quality contribution 33 (33a-33i) by continuous addition of defined device contributions 32 of the individual devices 31 or stations 31, respectively, is continued until the very last device contribution 33, this is usually the device contribution 32 in which the serial number 34 and further information on the injection-molded part 3, in particular the date and time 35, has been added, whereupon the quality contribution 33 is subsequently stored in a device 31 or externally.

Thus, for the first time, it is possible to trace all the devices 31 or stations 31, respectively, involved and their parameters after production of an injection-molded part 3 has been completed. For this purpose, it is only necessary that the serial number 34 or identification number of the injection-molded part 3 or the identification number of the box or tray is known, whereupon the corresponding associated quality contribution 33 can be automatically selected. Preferably, the quality contributions 33 are stored in such a way that the serial number 34 and/or production date 35 are included at any time, for example as a memory name, so that the corresponding quality contribution 33 for an injection-molded part 3 with a specific serial number 34 can also be searched for manually in a simple and quick manner.

As previously mentioned, a variety of benefits are achieved through such a quality system. The description also discloses specific methods or process steps that the individual devices 31 or stations 31, respectively, perform or are configured to perform.

FIG. 3 shows another design of a plastics industry system 1, in which a central supply with a material distributor 40 is used for the material, in particular granules 9. Here, a hopper (silo) 41 for the granules 9 is arranged outside or in the open, respectively, which is connected to the material distributor 40 via a supply line 42. From the material distributor 40, the granules 9 can be conveyed from the hopper 41 directly to the injection-molding machines 4. The granules in the reservoirs 22, 23 are first conveyed to a drying station 43. In the drying station 43, the granules 9 from the reservoirs 22, 23 are dried by heating, for example, with dry air, after which the granules 9 are conveyed again via the material distributor 40 to the further devices 31 or stations 31, respectively. The granules are once more transported by a vacuum system, for which purpose two vacuum units 20 are installed in the plant.

Via the material distributor 40, in the exemplary embodiment shown, several plastics processing devices, in particular injection-molding machines 4, are now organized, for example, each in their own work cells 2, 46 and 47. Here, the individual work cells 2, 46, 47 can be designed differently, wherein each work cell 2, 46, 47 produces its own injection-molded part 3 with the necessary devices 31 or stations 31, respectively, as previously mentioned. As described above, each device or station involved in the production of the respective injection-molded part 3 creates the device contribution 32 at the time of production and stores it, i.e. each device 31 or station, respectively, used or a device group with several devices 31 or stations creates its device contribution and stores it at least briefly.

However, in order to now create the essential quality contribution 33 for a corresponding injection-molded part 3, a collecting station 48 or a hardware or software 48 called Chain of Quality (CoQ), respectively, is used in this exemplary embodiment. Here, the collecting station 48 is connected to the individual devices 31 or stations 31, respectively, via network lines 49. It is mentioned that the collecting station 48 may be in the form of a computer, tablet, or controller and is designed for querying device contributions 32 from the individual devices 31 or stations 31, respectively, wherein the collecting station 48 retrieves the device contributions 32 and relates them over time so that the quality contribution 33 is created therefrom.

In the exemplary embodiments shown in FIGS. 1 to 3, it has been shown that it is advantageous if the delay times from the individual devices 31 or stations 31, respectively, are taken into account in the contributions to quality, in particular the device contribution 32, the quality contribution 33. Furthermore, the determination of quality in material conveyance has proven to be a very essential and difficult-to-solve task. For this purpose, the conveyed material or granules, respectively, 9 are split into material contributions 50, as schematically entered in FIG. 3 at the collection point 48, and stored, wherein this is preferably done in a database, wherein the material contribution 50 is formed by specially defined data on the material, in particular the estimated or measured quantity of the conveyed and/or processed material. Here it is also possible that each device 31 involved in the material conveyance and/or material processing supplements the material contributions 50, i.e. that in turn each involved device 31 or station 31, respectively, supplements its contribution for the quality to the material contribution 50, i.e. the conveying of the granules 9, so that in the end a file with the complete merged data for the material conveyance has been created, which can be integrated into the quality contribution 33. It can therefore be said that in the method described, three different contributions to the quality of the injection-molded part 3, namely each unit 31 its device contribution 32, a material unit or material contribution 50 for conveying the material or granules, respectively, 9, and the total quality contribution 33 are generated and stored. Here, the quality lies in the treatment of the material; in particular, it is necessary to know when what material is where and how it is treated. Therefore, a splitting is made into material contributions (delivery quantities). The material that continues to be conveyed at the same time is then considered in the subsequent unit 31 as one unit, that is, as a material contribution 50. This material contribution 50 is thus imprinted with a quality by the material treatment in the device 31, which is stored and recorded in the quality contribution 33.

However, another possible procedure is one where an input identification code (input ID) for a quality entry of a material contribution 50 is transferred to each device 31 from the collecting station 48 (CoQ) and an output identification code (output ID) for material contributions 50 with quality data supplemented by the device 31 is received from the collecting station 48. Thus, the flow of material through various stations 31 or devices 31, respectively, can be mapped using the identification codes (IDs), allowing easy tracking at any time.

Here it should be possible for the quality contribution 33, which contains the quality information of each station 31 involved, to be queried separately for each injection-molded part 3 produced. Preferably, this can be done on the collecting station 48 (CoQ) or on a computer, tablet or controller 17 to which the data, in particular the quality contributions 33, have been transferred. To enable rapid pinpointing, software programmed for this purpose runs on the collecting station 48 or a computer or tablet, respectively, or controller 17, via which, for example, the serial number 34 of the injection-molded parts 3, the date and time 35 of the time of manufacture or the material composition, can be queried and selected. Thus, at a later point in time, for example months or years later, it is possible to retrace the entire production chain or quality chain, respectively, via the software by simply entering the serial number of the injection-molded part 3, whereby any problem cases can be checked and, if necessary, also retrieved if errors were found in the quality of the production process.

Preferably, the data or only specific data for the quality contributions 33 and for the material contributions 50 are integrated into databases so that, if necessary, the data can be corrected subsequently. Especially when conveying material, an exact measurement is often not possible, so that for this purpose often estimated delivery quantities can be corrected afterwards when passing through metering units (blenders, injection-molding machines 4). In order to arrive at an estimated delivery quantity passing through metering units (blender, injection-molding machine 4), this is done using a control algorithm, which can also be adapted. This control algorithm preferably runs on that device 31 which is responsible for storage of the quality contribution 33 or material contribution 50, or on the collecting station 48. It has been shown to be advantageous if the underlying conveying model is supplemented by the data of actual material consumption measured at the injection-molding machine 4 or the blender, i.e. that the estimated conveying parameters are adjusted so that the estimated delivery quantities yield and match the processing quantities clearly measured elsewhere (blender, injection-molding machine 4). For this purpose, the system can be designed in such a way that a program, in particular a program using a "machine-learning" approach, detects when user interventions influence the delivery quantities and therefore do not need to be adjusted.

It also happens often that spouting of plastic from the injection unit of the injection-molding machine 4 is detected by CoQ, in particular the collecting station 48, by the injection mold being open, so that this process is taken into account when collecting data for quality or quality verification, respectively. As a matter of principle, it can be said that several such control mechanisms, which can be implemented in terms of software and/or hardware, are integrated in order to obtain, in as fully automated fashion as possible, proof of quality in the form of a quality contribution 33 for the injection-molded part 3. It is also possible that the shot weight and bulk density are used to infer the amount of bulk material used from the finished part, i.e. the injection-molded part, or that the weighed weight in the gravimetric metering device (blender) and the bulk density of the material are used to infer the actual delivery quantity.

The plastics industry system, in particular the collecting station 48 (CoQ), can be used in this context with stations 31 or devices 31, respectively, by different manufacturers by reading in the quality data via OPC UA and taking the processes behind them into account as specified by the collecting station 48, in particular the CoQ. Furthermore, the collecting station 48 can register as a participant of a work cell 2, 46, 47 with a work cell controller, wherein the work cell controller is connected with all devices 31 of a work cell 2, 46, 47, wherein the work cell controller on the one hand carries out the communication or the data exchange with the preferably company-internal network, in particular an intranet and/or an Internet, and on the other hand with the devices 31 or stations 31, respectively, of the work cell (2, 46, 47) and establishes direct communication of the production resources (5) among themselves.

In this context, it is possible that the collecting station 48 (CoQ) can be implemented as a software application, in particular as a "chain of quality software" (CoQ), which is installed and operates, for example, in the work cell controller. Here the CoQ software provides an option, for example, that it offers a website to be administered. It is also envisaged that several such CoQ softwares, in particular CoQ devices, can be installed or cascaded, respectively, and thus quality data from several work cells 2, 46, 47 be read in and further supplemented in parallel.

Also, quality data on the finished part or injection-molded part, respectively, 3 can be reported by the removal robot 5, in particular by the robot 5, to the CoQ software or the collection point 48 or to the device 31, respectively, on which the CoQ software for the quality contributions 33 and/or material contributions 50 is running, i.e., the quality data of all material contributions 50 contained in the finished part 3 or injection-molded part 3 together with the quality information supplemented by the extraction robot 5 can be supplied and queried by CoQ. Here, for example, data from the conveyor belt 8, for example when used as a cooling line, with its delay times can also be processed as a station/device 31 by CoQ or the collecting station 48, respectively, so that the quality of that part 3 which is currently at the end of the conveyor belt 8 can likewise be supplied by CoQ.

In order to be able to process a seamless chronological sequence of the data in the contributions, the exact time of the processing of each process involved is necessary, so that this is also stored. It is also possible for automated data to be taken via software from the CoQ, such as serial number 34 or identification number, or data stored in databases, such as estimated delivery quantity, and added to the quality contribution 33 and/or material contribution 50.

Furthermore, FIG. 4 shows a further exemplary embodiment of a composition of a plastics industry system 1, wherein in this exemplary embodiment, those devices 31 which are provided with a material reservoir 51, such as drying hoppers 52, 53, blenders 54, 55, injection-molding machine 4, are discussed in more detail, in particular the details about material management.

A special material controller 55 (also called FiFo) is integrated into these devices 31, which is responsible for managing the material, in particular granules 9, in its material reservoir 51 and by which the material contribution 50 is created for integration in the quality contribution 33 (33*a* to 33L). Thereby, the material controller 55 stores in the material contribution 50 a material unit ID and the size of this material unit, as well as a quality value, which in particular states whether all parameters were in the valid range during the process and is defined by an OK or NOK. In the case of the material reservoir 51, the material is preferably filled from above and removed from below, so that a wide variety of layers can form therein, so to speak, since material is filled in at a wide variety of times. Especially if the material reservoir 51 or alternatively the material hopper is connected to a dryer 51*a*, as schematically shown, so that in the material hopper 51, depending on the residence time of the granules 9, these are differently dry, it is of importance that the degree of dryness or the residence time of these layers is included in the material contribution.

In the exemplary embodiment, the devices 31 for conveying the material, in particular the granules 9, are grouped in a cell 56, which is shown dash-dotted outlined. If a loader 57, 58, which is installed e.g., on the drying hopper 52, 53, withdraws material, in particular granules 9, this is detected by the "COQ" quality system, in particular the "Chain of Quality Software", and transfers a new material contribution 50 to the drying hopper 52, 53, which consists of the material unit ID and the size of the material unit. Thus, the material contribution 50 is unmistakable and unambiguously assignable at least by the material unit ID, wherein the size is formed by the loader 57, 58 used and additionally by a correction value calculated by detection of the actual material consumption at the blender 54.

The drying hopper 52, 53, in particular its material controller 55, stores this material unit ID with the associated size, for example 10. For example, if the conveying device, in particular the loader 57, is now conveying, COQ queries the drying hopper 52 for the list of material unit IDs for the size of the loader 57. This means that if the next material unit in the drying hopper 52 has size 10 and the COQ wants size 7, the rest of the material unit in drying hopper 52 will remain, but will now merely have size 3. When the next query is sent to the drying hopper 52 with size 7, this now provides two material unit IDs, and the next stored material unit has a size of 6, since the existing rest, namely size 3, is removed with the new size 4 to supply 7 units, thus again leaving a rest of size 6. For example, if a size of 25 is to be queried or conveyed, respectively, two material units will be conveyed from the drying hopper 52, and the lowest one will have a size of 5, because one material unit with a size of 10 and another material unit also with a size of 10 were conveyed and subsequently now merely one material unit with a size of 5 was conveyed, leaving the rest with a size of 5.

The drying hopper 52 supplies material to the blender 54 via the loader 59 and transfers the new quality contribution 33*g* to the blender, which practically contains the previously involved devices 31 or stations, respectively, and their device contributions 32 and/or material contributions 50, i.e., also this one from the drying hopper 52. Here it is also possible that the material contribution 50 is sent separately, so that the blender 54 receives the essential data directly and does not have to take them from the quality contribution 33*g* first, if the blender 54 needs information or data, respectively. The blender 54 in turn has a material hopper of its own 62, which is filled with material by the loaders 59 to 61. Here, a material controller 63 is in turn present in the blender 54, which provides the management of the material, so that the blender 54 independently creates and stores the material withdrawal from its material reservoir 62 during generation of a so-called batch. A batch is a composition of several raw or granule materials, respectively, 9, so that the composition of the material unit IDs and the size of the batch are stored by the blender 54 and at the same time a material contribution 50 is created, which is completed in its quality contribution 33*j*.

Subsequently, the compiled batch is transferred from the blender 54 to the injection-molding machine 4, so that with the transfer of the quality contribution 33*j* to the injection-molding machine 4, a new material unit ID has thus been transferred by the COQ. Since material is in turn processed, in particular plasticized, in the injection-molding machine 4 and the injection-molded part 3 is produced therefrom, the injection-molding machine 4 also comprises such a material controller 64 (FiFo). As soon as the injection-molding machine 4 provides the material controller 64 with the information that a new injection-molded part 3 has been produced, the COQ again queries the first entry of the machine control 64 with the shot size and stores it again under a new material unit ID, in particular a material contribution 50, with the link to the material unit IDs provided by the injection-molding machine 4. In addition to the COQ data from the injection-molding machine 4, the COQ data, i.e. the quality contributions, in particular the device contributions, from other devices 31, such as TCUs, flowcons, can also be stored in this case.

If the COQ detects that the material in the blender 54 or in the injection-molding machine 4 is becoming more and more, e.g., because more material is constantly being fed in than is being removed, the COQ must automatically adjust the sizes of the conveying devices, in particular of the loaders 57 to 61, so that the theoretical material flow is automatically adjusted to the actual material flow. The same applies if it is ascertained that more material is being removed than was actually conveyed in. Thus, at the same time when the COQ creates the quality contribution 33, it also performs monitoring or control, respectively, for the plastics industry system 1.

Thus, in the COQ there can be a table of values of interest to the COQ for each type of device found, wherein the corresponding values are entered in the quality contribution 33, or the entire lists may be included in the quality contribution 33. In the exemplary embodiment of FIG. 4, the quality contribution 33 is not related to only one injection-molded part 3, but to a batch 65, as schematically shown by the packaging of many injection-molded parts 3 in a box 66, wherein in the quality contribution 33 it can however be seen which injection-molded parts 3 are packaged therein.

As already described, the production resources or devices, respectively, 31 can be organized in a work cell 2, in the case of material conveyance and drying this is preferably done in such a way that the material conveyance feeds several/all work cells 2, 46, 47, whereby above all the quality must also be collected during the preparation of the material or granules 9 and an assignment is made as to which material contributions belong together with which device contributions 32, preferably in terms of time.

It was found very advantageous to have the robot provide, as a device contribution, e.g. the box ID in which the injection-molded part 3 is placed. In this context, it is also possible that the part ID is supplied or can be printed out, respectively, when cooperating with a printer that prints the ID number on the part, in particular the injection-molded part 3. For this purpose, the robot 5 could also provide the position where the part or injection-molded part, respectively, 3 was stacked in the box, or the time when the part came out or was taken out at the conveyor belt 8. These data could be imprinted as the device contribution 32 of the part quality to be stored or in the quality contribution 33, respectively.

It can therefore be said that during a production cycle or production run, respectively, i.e., from the extraction of the granules from a reservoir and/or a hopper down to the creation of the injection-molded part 3 and the subsequent extraction and deposition of the produced injection-molded part 3 from the processing machine by the robot 5 and a possible subsequent quality control via a camera system 15, together with the plastic mass passed on from station 31 to station 31 in granular, plasticized or solid form also quality information is passed on in the form of one or several quality contributions 33, which may relate to different material quantities, wherein these quality contributions 33 are further supplemented by each device 31 or station 31 involved by device contributions 32 and/or material contributions 50, or existing data, in particular material quantities, are changed, i.e., a method for quality control and/or follow-up of an injection-molded part 3 produced in a production cycle with preferably at least one processing machine 4 of the plastics-processing industry, as well as upstream and/or downstream production resources or devices 31 or stations 31, for example storage devices 22, 23, 44, 45 or hoppers 41 for granules 9, granule dryers 29, 43, material distributors 40, metering devices 11, temperature control units 13, flow controllers 14, robots 5 and/or camera systems 15 and/or measuring devices for quality control, which are interconnected preferably via a network 49, wherein at least one quality contribution 33 is created for each injection-molded part 3 or batch, wherein during the production cycle each device 31 including the processing machine 4 creates a quality contribution 33 in progressive sequence in the production chain down to the finished injection-molded part 3, which quality contribution 33 consists of a device contribution 32 and/or material contribution 50 coordinated for this device 31 or station 31 and is passed on in the production chain to the next device 31 or station 31 and there in each case supplemented by the corresponding quality contribution, or the device contributions 32 and material contributions 50 of the devices 31 or stations 31 are queried by a collecting station 48, preferably a hardware and software (CoQ—"Chain of Quality"), or are sent to the collecting station 48 and are combined to form at least one quality contribution 33.

For the sake of completeness, it is mentioned that e.g. a plurality of further material contributions 50 can be generated from one material contribution 50 by the devices 31 or stations 31, as is the case, for example, for the storage or drying, respectively, of the material, in particular granules 9. In this case, for example, a larger quantity of granules 9 is stored in a hopper 41 or reservoir 22, 23, 44, 45, whose parameters, such as the type of material, the total volume, the batch number, the filling date, etc., are stored in a material contribution 50, whereby subsequently only a small quantity of granules 9 is removed by the various conveying devices 31, which is recorded in a new material contribution 50 or in a supplemented or modified, respectively, material contribution 50 and added to the quality contribution 33. Here it is essential that the material contribution 50 is formed by specifically defined data on the material, in particular the estimated or measured amount of material conveyed and/or processed.

It is pointed out that the invention is not limited to the embodiments shown, but may comprise further embodiments.

The invention claimed is:

1. A method for quality control and/or tracking of an injection molding part produced in a production cycle with at least one processing machine of the plastics-processing industry, and upstream and/or downstream production devices or stations, which include reservoirs or hoppers for a material; granulate dryers; material distributors; conveying devices; metering devices; temperature control units; flow controllers; and at least one of robots, camera systems or measuring devices for quality control, which are interconnected via a network, the method comprising:

assigning to each individual injection molding part or a specific number of injection molding parts a quality contribution consisting of a plurality of quality contributions from a start of granulate conveying to a finished injection molding part, wherein each of the devices or stations in the production cycle generates a respective one of the plurality of quality contributions, which includes at least one of a device contribution or a material contribution, extends the respective one of the plurality of quality contributions by quality contributions of upstream devices or stations, and forwards the respective quality contribution to a downstream device or station.

2. The method according to claim 1, wherein in the devices or stations, a material controller is used for management of the material.

3. The method according to claim 1, wherein the device contribution of a device is formed by data of the device and with a time stamp.

4. The method according to claim 1, wherein the quality contributions of all devices or stations for producing the injection molding part are placed in a temporal sequence.

5. The method according to claim 4, wherein, in the preparation of the temporal sequence in the quality contributions, delay times for preparation or processing of the material in the individual devices or stations, respectively, are taken into account when creating the temporal sequence in the quality contributions, wherein the delay times are determined by the individual devices or stations, by a test run, or manually set and stored.

6. The method according to claim 1, wherein the material conveyed from the reservoir or hoppers is divided into material units, in the size of the delivery volume of a material loader used, and the quality of the material units is stored in a database or passed from one device to another device.

7. The method according to claim 6, wherein the quality of the material units are stored in tables in the database in relation to a device type and are related via IDs (identification codes).

8. The method according to claim 6, wherein the quality of the material units is further supplemented by each device involved in processing of the material units.

9. The method according to claim 1, wherein an estimated delivery quantity of the material or material unit conveyed in a material loader when passing through devices with dosing functionality or quantity measuring devices is correctable retrospectively by adapting one or more distributed databases/lists with stored delivery quantities or by using a control algorithm.

10. The method according to claim 9, wherein the estimated delivery quantities or conveying parameters, respectively, are calculated to result in delivery quantities measured in devices, including injection-molding machines or dosing devices, having measurable delivery quantities.

11. The method according to claim 1, wherein data of a device contribution from one of the devices or stations in which the injection molding part is produced and/or from a time at which the injection molding part is taken from a conveyor belt is stored.

12. The method according to claim 1, wherein the conveying devices include a conveyor belt, used as a cooling section, that is processed with delay times as one of the devices or stations, so that the quality contribution of the injection molding part at the end of the conveyor belt is detected.

13. The method according to claim 1, wherein an exact time of processing of a material unit is recorded and stored by each of the devices or stations.

14. The method according to claim 1, wherein the material comprises granules.

15. The method according to claim 1, wherein a separate collection station comprises hardware and software for Chain of Quality (COQ).

* * * * *